May 5, 1942.  H. O. BERNDT  2,282,159
TEAT CUP
Filed April 1, 1940
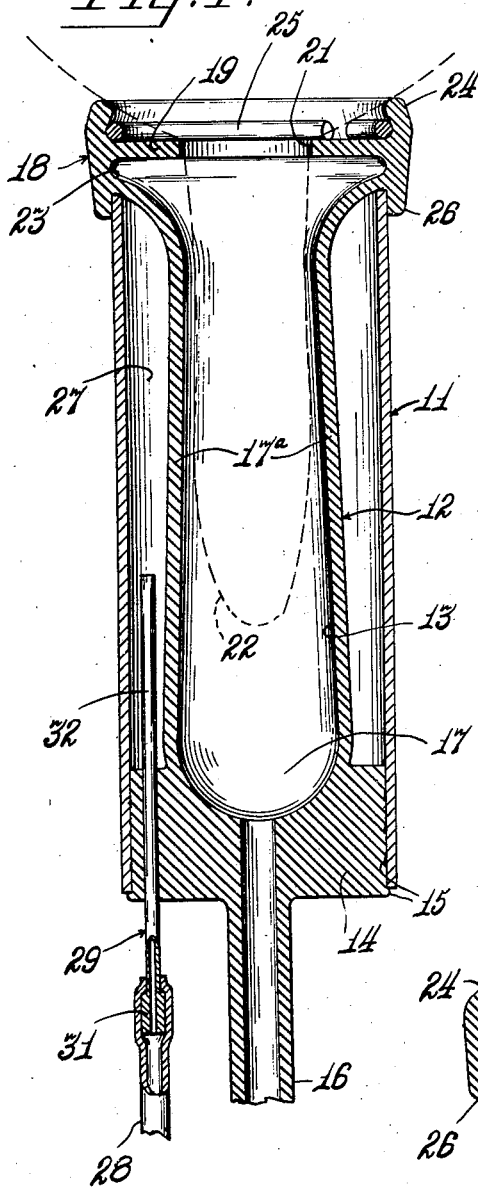
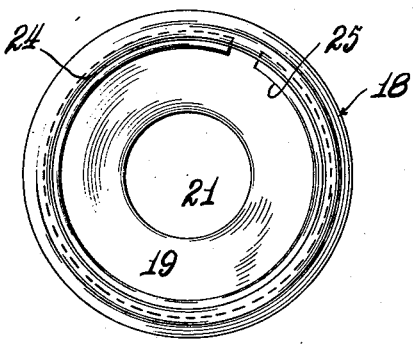
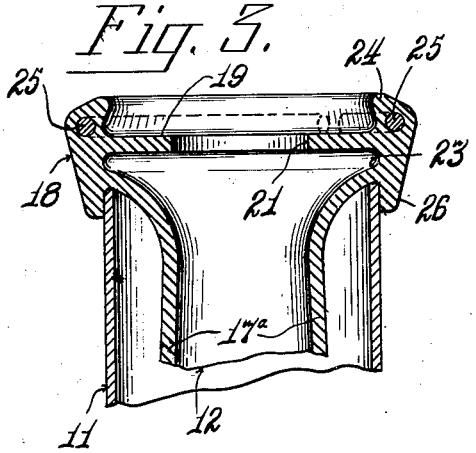
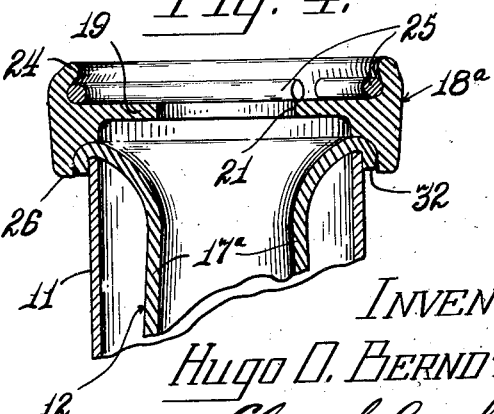
INVENTOR.
Hugo O. Berndt.
Elmer L. Quickel.
ATTORNEY.

Patented May 5, 1942

2,282,159

UNITED STATES PATENT OFFICE 2,282,159

TEAT CUP

Hugo O. Berndt, Hartford, Wis., assignor to Harold H. Berndt, Hartford, Wis.

Application April 1, 1940, Serial No. 327,101

11 Claims. (Cl. 31—85)

The invention relates generally to vacuum operated milking apparatus and more particularly to improvements in teat cups.

Known types of teat cups are formed with an outer rigid casing shell and an inner flexible lining or inflation element preferably made of pliable rubber. The inflation element has its walls spaced from the walls of the shell and is suitably secured at its ends to the corresponding ends of the shell. While in use, the space inside the lining receives the teat of a cow inserted in its top end and its lower end is connected to the milking vacuum so that milk drawn or expressed from the teat is carried away. The annular space between the lining and the shell is connected, usually by a flexible hose, to a suitable pulsator apparatus whereby through regular withdrawal of atmosphere from said space and its admission thereto, said wall of the lining is caused to expand and then contract around and squeeze the teat and thus, with the combined action of the vacuum suction on the teat, to effect the milking operation.

Known types of teat cups also include a perforate diaphragm at the upper end of the inflation element which is intended to seal the interior of the element when fitted over the teat. However all known diaphragms squeeze the teat and when work or if initially pliable, they tend to warp or wrinkle and are drawn downwardly intermittently during the milking operation. This results in excessive pressure on the teat and causes irritation.

Such known types of teat cups are highly objectionable because their use fails to facilitate fast, efficient milking. This condition is due primarily to the known fact that a cow cannot tolerate a pressure on its teats greater than the atmospheric pressure. When a teat cup is fitted over a teat, the teat initially shrinks and after a moment it returns to and, because of internal pressure, enlarges beyonod its initial diameter. Thus, an internal pressure greater than atmospheric pressure is present at the diaphragm opening and any excessive external pressure such as that above described is a source of irritation. The natural tendency is for a cow to let down milk if not unduly irritated. However, if the pressure of the lining in a milking device or of the diaphragm is greater than the natural pressure within the udder during milking, the added discomfort distresses the cow and it will not let down the milk or will let down very little at a time. The amount of milk let down, if any, under such circumstances is just enough to relieve the natural pressure in the udder. When this condition exists the milking device must be removed and the milking completed by hand.

It is therefore, an object of the present invention to provide a teat cup with structural features designed to insure an uninterrupted flow of milk during the operation of the milking apparatus.

Another object is to provide an inflation element with means to prevent squeezing or otherwise irritating the teat or udder.

Another object of the invention is to provide an inflation element of improved construction.

Another object is to provide an inflation element with means to retain the head or teat receiving end permanently expanded.

Another object is to provide an inflation element with means to retain the sealing flange or diaphragm taut and consequently prevents its collapse.

Another object is to provide an improved teat cup assembly which is not expensive to manufacture and is easy to assemble or disassemble.

Another object is to provide a teat cup of the type embodying means to facilitate complete expression of all milk.

Another object is to provide a teat cup assembly with adjustable means to compensate for progressive shortening of the conduit leading to the pulsating apparatus.

The foregoing and such other objects of the invention as will appear hereinafter as the description proceeds, will be more readily understood from a perusal of the following description; in which reference is made to the accompanying drawing, wherein:

Fig. 1 is a longitudinal sectional view of the teat cup assembly.

Fig. 2 is a plan view of the head or teat receiving end.

Fig. 3 is a fragmentary longitudinal sectional view of a modified form of teat cup.

Fig. 4 is a fragmentary longitudinal sectional view of a teat cup having a separable diaphragm cap.

Like numerals appearing in the description identify corresponding parts of the drawing.

Referring specifically to the structure illustrated in Figs. 1 and 2, a cylindrical teat cup shell 11, comprising a length of metal tubing, has a teat cup liner or rubber inflation element 12 mounted therein. The inflation element 12 includes an intermediate body portion 13 terminating at its lower end in a relatively thick external flange 14. The outside diameter of the flange 14 is slightly greater than the inside diameter of the shell 11 so that, when in the assembled position illustrated, the flange 14 hermetically seals the lower end of said shell. If desired, suitable spaced annular beads or ridges 15 may be formed on the circumferential face of the flange 14 to increase the friction between the opposed cylindrical surfaces.

The flange 14 terminates in a conduit 16 which communicates at one end with the space 17 inside the body portion 13 of the inflation element. Its other end is connected by a detachable hose connection (not shown) to the milking vacuum. As illustrated, the annular wall 17a of the body portion 12 is spaced from the shell 11 and tapers inwardly to near its teat receiving end at which point it flares outwardly to overlie the upper or head end of said shell. A relatively wide pliable cylindrical collar 18 is formed integral with the upper end of the flared body wall and includes an internal annular flange or diaphragm 19, of such size as to leave an opening 21 to receive the teat 22. The diaphragm 19 preferably is spaced a short distance above the juncture 23 of the flared wall 17a with the collar 18.

Because the entire inflation liner is made of pliable rubber, the collar 18 and its associated parts normally are smaller in diameter then the diameter of the shell 11. Consequently, the collar 18 and the said parts must be stretched prior to being fitted over the top edge of the shell. To this end, the collar 18 is of sufficient width to protrude a short distance above the plane of the diaphragm 19, to provide a retaining wall 24 arranged to receive a split expansion ring 25. The ring 25 preferably is formed of spring steel and it is forced inside the wall 24 into a position tightly against the top face of the diaphragm 19 as shown. As the diameter of the ring 25 normally is greater than the inside diameter of the retaining wall 24, said wall is stretched outwardly annularly and consequently the diaphragm 19 is drawn taut and its opening 21 is enlarged to a size that will easily receive the teat and effect a hermetic seal therewith.

Stretching of the upper portion or retaining wall 24 of the collar constricts its annular lower lip portion 26 so that it snugly embraces the upper marginal edge of the shell 11 and consequently hermetically seals the upper end of the annular space 27 which is connected to a pulsating machine through a flexible hose 28 and a tubular fitting 29. The fitting 29 is suitably enlarged at its lower exposed end 31 to snugly receive the hose 28, and its stem portion 32 extends through an opening in the flange 14 into the space 27.

In known types of milking apparatus the hose 28 frequently breaks off at its connection with the teat cup, thus necessitating replacement. Replacement cost is minimized in the present instance by the long fitting 29 which can be progressively withdrawn from the annular space 27 to compensate for portions of the hose which break off. This arrangement is particularly advantageous because replacement hose is distributed in standard lengths and a new one need not be installed until the fitting 29 has been withdrawn to position its inner open end substantially in the plane of the inside face of the flange 14.

In operation, the milking vacuum is turned on and the open end or head of the teat cup is slipped over the teat until the retaining wall 24 of the collar 18 abutts the udder substantially as illustrated in dotted lines in Fig. 1. The vacuum maintained within the inflation element 12 is constant and its primary purpose is to assist the expression of milk from the teat. This partial vacuum within the inflation element tends to draw the teat downwardly and pull the diaphragm 19 downwardly into the interior of the inflation element. The wall 17a of the inflation element also moves inwardly to embrace the teat. However, due to the presence of the split ring 25 immediately above the diaphragm, said diaphragm is held taut and is not effected by this pulling action. Consequently, the retaining wall 24 also remains stationary and does not pinch, rub or otherwise irritate the udder. When the pulsating machine is placed in operation to intermittently evacuate the annular space 27 of substantially all of its atmosphere, the cylindrical wall 17a of the inflation member expands outwardly and then returns to its normal position without pinching the teat. This action is effected by having a greater negative pressure within the annular space 27 than is present within the inflation element.

It is to be noted that the present structure, featuring the split ring and the flared inflation element, is such that the udder and teat are never pinched or irritated. This is effected, as to the inflation element liner body 13 by the enlargement of its lower end. That feature distinguishes from most known liners which converge at their lower end to limit inward movement of the teat due to the ever present suction and consequently remain a source of constant irritation. With respect to the diaphragm and the upper portion of the liner, pinching and irritating are avoided by locating the tensioned split ring 25 immediately above the diaphragm. It is evident therefore, that the flow of blood through the teat and udder is not restricted and said parts do not swell. Accordingly, the flow of milk is not at any time restricted but continues to flow in a steady stream until the quarter is completely dry.

The modified structure shown in Fig. 3 is, in all essentials, substantially like that illustrated in Fig. 1. In this embodiment, the split tension ring 25 is moulded or otherwise embedded within the upper wall portion 24 of the collar 18, the plane of its lower edge being substantially in the plane of the top surface of the diaphragm 19. Consequently, it has the same effect on the collar 18 as the split ring illustrated in Fig. 1; its function being to hold the diaphragm 19 taut and to stretch the entire head end of the liner.

Fig. 4 shows a separable collar 18a which is designed primarily as a replacement element for certain existing types of teat cups. As shown, the walls 17a of the inflation element flare outwardly over the upper end of the shell 11 and are then turned downwardly as at 32. The collar 18a (which is constructed like that shown in Fig. 1) is, in this instance, fitted tightly over the downturned portion 32 of the inflation element to hermetically seal the connection.

I claim:

1. In a teat cup including a cylindrical shell, a pliable inflation element carried within said shell comprising a substantially tubular body, said body being slightly larger in diameter at one end than at the other, an external collar on the reduced end of said body, an annular lip on one edge of said collar adapted to overlie said end of the shell, an internal annular flange spaced inwardly from the other edge of said collar, and a split ring carried in said collar adjacent the outside face of said internal flange to expand said collar and retain the flange taut.

2. In a teat cup including a cylindrical shell, an inflation element carried within said shell comprising a substantial tubular body, an external sealing flange integral with one end of said body adapted to fit snugly within one end of said shell, a collar integral with the other end of said body, a sealing lip on said collar adapted to overlie and embrace the other end of said shell, an internal annular flange in said collar inwardly of its free end, and an expansion ring carried in said collar adjacent the outside face of the internal flange, said ring retaining the collar under tension to stretch and hold the internal flange taut.

3. A teat cup comprising, in combination, a rigid cylindrical shell, a flexible inflation element carried within said shell having a circumferential collar on its upper end, said collar including an internal diaphragm of substantially uniform thickness and a circumferential lip on its lower edge to embrace one end of said shell, and an expansion ring carried in said collar above the top surface of the diaphragm to hold said diaphragm substantially taut.

4. A teat cup comprising, in combination, a rigid cylindrical shell, a flexible inflation element carried within said shell having a circumferential collar at its upper end, said collar including a diaphragm, a lip on the lower edge of said collar arranged to embrace one end of said shell, and an expansion ring carried in said collar above the top surface of the diaphragm for expanding the upper portion of the collar to hold the lip tightly around said shell.

5. In a teat cup, the combination of, an inflation element having a teat receiving end, an internal annular flange adjacent said end, said flange having a substantially uniform thickness, and an expansion element located between said end and said flange to retain the flange taut.

6. In a teat cup, an inflation element liner having a teat receiving end, an internal annular flange in said element defining a flexible diaphragm spaced inwardly from said end, and a split ring carried in said element between said flange and said end, said ring expanding the teat receiving end and retaining said flange taut.

7. The combination with a cylindrical teat cup shell, of a rubber inflation element carried by the shell comprising a tubular liner having its upper end formed with a collar, said collar including a circumferential lip extending below the juncture of the body of the liner and the collar to overlie one ened of said shell, a flexible internal annular flange in said collar, and an expansion ring carried in said collar above said flange to expand that part of the flange above said juncture and impart rigidity to said internal flange.

8. In a teat cup having a rigid tubular shell and a flexible inflation element therein, a substantially firm flexible collar at the teat receiving end of said element, an internal annular flange of substantially uniform thickness in said collar, said flange being located substantially midway between the edges of said collar, a split expansion ring on the top face of the flange arranged to engage and urge the collar outwardly to stretch and retain said flange taut at all times, and a lip on the bottom edge of said flange to embrace and overlie one end of the shell.

9. The combination with a cylindrical teat cup shell having an inflation element arranged therein to define with said shell a sealed annular space adapted to have its atmosphere exhausted at ragular intervals, of a tubular conduit fitting having one end portion slidably mounted in said element and communicating with said space, said fitting being longitudinally adjustable to vary the length of the end portion extending from said element.

10. The combination with a cylindrical teat cup shell having an inflation element arranged therein, said shell and element defining a sealed annular space, of a tubular conduit fitting having one end extending through said element into said space, and a flange on the exposed end of said fitting adapted to receive a flexible conduit thereover, said fitting being longitudinally adjustable in said element to vary the length of the exposed portion of said fitting.

11. The combination with a teat cup shell having an inflation element arranged therein, said shell and element defining a sealed space, of a conduit fitting mounted with one end extending into said space and being adapted to receive a flexible conduit on its exposed other end; said fitting being longitudinally adjustable in its mounting to vary the length of the exposed portion of said fitting.

HUGO O. BERNDT.